//www.nrcresearchpress.com/doi/10.1139/y90-137# —

United States Patent [19]

Avezou

[11] Patent Number: 4,651,631
[45] Date of Patent: Mar. 24, 1987

[54] MANUFACTURE OF PISTONS

[75] Inventor: Jean-Claude Avezou, Poitiers, France

[73] Assignee: AE Plc, Warwickshire, England

[21] Appl. No.: 739,210

[22] Filed: May 30, 1985

[30] Foreign Application Priority Data

May 30, 1984 [GB] United Kingdom ................ 8413800

[51] Int. Cl.4 ............................ F16J 1/04; B23P 15/10
[52] U.S. Cl. ................................ 92/224; 29/156.5 R;
29/527.5; 29/DIG. 5; 29/DIG. 10; 29/DIG.
48; 92/260; 123/193 P; 164/97; 164/98;
219/121 ED
[58] Field of Search ......... 29/156.5 R, 527.5, DIG. 5,
29/DIG. 10, DIG. 48; 92/172, 211, 213, 222,
224, 231, 260; 123/193 P; 164/91, 97, 98;
219/121 EC, 121 ED

[56] References Cited

U.S. PATENT DOCUMENTS

| 2,473,254 | 6/1949 | Morris ...................................... 92/213 |
| 3,190,273 | 6/1965 | Bachle et al. ..................... 92/231 X |
| 3,354,793 | 11/1967 | Meier et al. ............................. 92/231 |
| 3,596,571 | 8/1971 | Hill et al. ....................... 123/193 P X |
| 3,914,574 | 10/1975 | Hill et al. .................... 29/156.5 R X |
| 4,334,507 | 6/1982 | Köhnert et al. ............ 29/156.5 R X |
| 4,498,219 | 2/1985 | Ban et al. ..................... 123/193 P X |
| 4,548,126 | 10/1985 | Donomoto et al. .................... 92/213 |

FOREIGN PATENT DOCUMENTS

| 1933520 | 8/1970 | Fed. Rep. of Germany .. 20/156.5 R |
| 2701421 | 7/1977 | Fed. Rep. of Germany ... 29/156.5 R |
| 2726273 | 12/1977 | Fed. Rep. of Germany . |
| 2,930,552 | 5/1980 | Fed. Rep. of Germany. |
| 1103 | 12/1979 | PCT Int'l Appl. .................... 92/211 |
| 1,069,609 | 5/1967 | United Kingdom. |
| 1,075,508 | 7/1967 | United Kingdom. |
| 1,097,056 | 12/1967 | United Kingdom. |
| 1260599 | 1/1972 | United Kingdom . |
| 1277579 | 6/1972 | United Kingdom . |
| 1364429 | 8/1974 | United Kingdom . |
| 1441984 | 7/1976 | United Kingdom . |
| 1542230 | 3/1979 | United Kingdom . |
| 2,027,518A | 2/1980 | United Kingdom. |
| 2,930,551 | 5/1980 | United Kingdom. |
| 2090780 | 7/1982 | United Kingdom . |
| 2096932 | 10/1982 | United Kingdom . |
| 2106433 | 4/1983 | United Kingdom . |
| 2134021 | 8/1984 | United Kingdom . |

*Primary Examiner*—Howard N. Goldberg
*Assistant Examiner*—Ronald S. Wallace
*Attorney, Agent, or Firm*—Leydig, Voit & Mayer

[57] ABSTRACT

A piston is formed in two parts. The main part is formed by gravity die casting from aluminum or aluminum alloy and a second part of the piston is formed by a squeeze casting process to produce a material which is stronger and more resistant than the gravity die cast aluminum or aluminum alloy. At least one piston ring groove is formed in the second part. The two parts are then electron beam welded together to form the complete piston. The squeeze cast portion may be reinforced with whiskers or fibres to further improve its properties. This method of construction has the benefit that only the minimum amount of the piston is formed by the more expensive and time-consuming squeeze casting process so that parts of the piston which do not require the improved properties given by squeeze casting are simply gravity die cast. This is of particular benefit in large diesel pistons.

7 Claims, 7 Drawing Figures

MANUFACTURE OF PISTONS

BACKGROUND TO THE INVENTION

1. Field of the Invention

The invention relates to the manufacture of pistons.

2. Review of the Prior Art

It has been customary to manufacture the basic piston shape by a single piston-forming process; by forging, by gravity die casting or, more recently, by squeeze casting methods in which molten metal is gravity fed to an open die, the die then being closed and the metal solidified under a force of many tonnes. Each of these methods has advantages in the formation of certain parts of the piston but disadvantges in the formation of certain other parts of the piston.

In the case of forging, this method has the benefit of producing high strength so that highly stressed parts of the piston, such as gudgeon pin bosses, are very strong when forged. It has the disadvantage, however, that it is difficult to produce crown end piston features, such as combustion bowls or piston ring grooves, by forging; these require subsequent machining and, possibly, shaping operations.

Gravity die casting has the advantage that pistons can be produced easily and cheaply by this method. The incorporation of inserts can be readily accomplished by using, for example, the Al-Fin bond. Gravity die casting has the disadvantage, however, that it does not have a high strength, as compared with forging, and is not particularly resistant to the elevated temperatures often found at the crown end of a piston, particularly where that piston is for a diesel engine.

Squeeze casting has the advantage that a piston so produced has a more uniform structure than gravity cast pistons, with an absence of voids. This makes the piston mechanically stronger as well as improving generally the properties of material. The production of pistons by squeeze casting is, however, more expensive and time-consuming than their production by conventional gravity die casting. In addition, while the improved properties are desirable or necessary in certain parts of the pistons, such as the crown region, they are not as desirable or necessary in other portions of the pistons, such as the lower skirt region. This is particularly true where the pistons are very large diesel pistons where the crown is subject to high temperatures and where the volume of material involved in the manufacture of the piston makes squeeze casting expensive.

SUMMARY OF THE INVENTION

According to a first aspect of the invention, there is provided a method of manufacturing a piston for an internal combustion engine, comprising forming the piston from main and second piston portions connected together by a welding technique, the main piston portion being formed by a first piston forming process and the second piston portion being formed by a second piston forming process, with said second piston portion including at least a part thereof which is more resistant than said main piston portion, and then forming in said resistant part, a piston ring groove having spaced radially extending surfaces interconnected by a base.

According to a second aspect of the invention, there is provided a piston when made by the method of the first aspect of the invention.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figure 1:
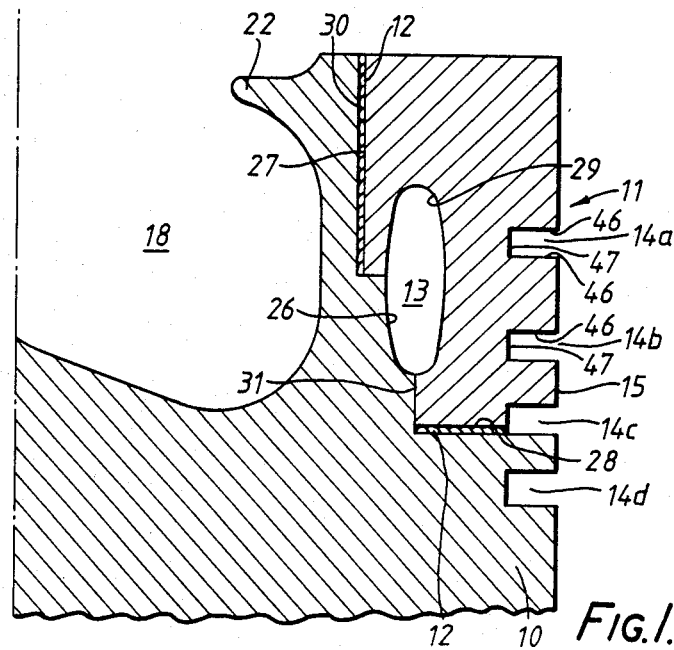
FIG. 1 is a cross-section of part of a crown end of a first piston for an internal combustion engine, which is formed from main and second portions connected together by a welding technique.

Referring first to FIG. 1, the first piston, which may, for example, be a large piston for a diesel engine, is formed by a main piston portion 10 and a second piston portion 11, connected to the main portion by a weld 12. The main piston portion is either gravity die cast or forged from aluminium or an aluminium alloy. The first piston portion 10 forms a complete combustion bowl 18 including an entrance 22. This portion 10 is also machined to provide a lowermost piston ring groove 14d and an inner and lower portion 26 of a gallery 13 extending around the crown of the piston for cooling oil. Also provided are two L-shaped rebates 27, 28, with one, 27, leading upwardly from the upper edge of the gallery portion 26 to the crown surface, and with the other, 28, leading from the lower edge of the gallery portion to a ring band 15.

A second piston portion 11 is formed by a squeeze casting process from a molten aluminium or aluminium alloy such as Lo-Ex. The molten metal or metal alloy is gravity fed into a die which is closed by a movable die member. The molten metal is then solidified under a force of many tonnes to form the second piston portion 11. After solidification, the die is opened and the squeeze cast member of homogeneous metal or metal alloy is removed.

Next, the squeeze cast member is machined to form the second piston portion. In this machining, the portion 11 is shaped to be generally annular with a flat upper surface and a curved outer surface formed with three upper piston ring grooves 14a, 14b, 14c. Each piston ring groove has spaced radially extending surfaces 46 interconnected by a base 47. The inner surface is shaped to provide the remainder 29 of the gallery 13 and is formed with two projecting L-shaped portions 30, 31 corresponding to the two L-shaped rebates 27, 28 on the main portion 10.

After the two portions 10, 11 have been formed, they are connected together by any suitable welding technique, for example, an electron beam welding technique, with the welds 12 extending only between the vertical surface of the rebate 27 and the corresponding vertical surface of the L-shaped portion 30 of the squeeze casting 11, and between the horizontal surface of the rebate 28 and the corresponding horizontal surface of the other L-shaped portion 31. The remaining horizontal and vertical surfaces are left unconnected, partly because their connection is not strictly necessary and partly because of the difficulty of effecting a connection in these regions. In this way, the complete piston is formed.

The piston has the two uppermost piston ring groove 14a, 14b, formed wholly in squeeze cast material, which is better able to resist the wear of piston rings at operating temperatures than the metal or metal alloy of the main piston portion 10. In addition, the squeeze cast second piston portion 11 provides a reinforced edge to the crown of the piston, so increasing the resistance of this part of the piston to the effects of operating temperatures. However, the proportion of the piston formed by the expensive, and comparatively more difficult, squeeze casting process is kept to a minimum; the majority of the piston being made from gravity die cast or forged aluminium or aluminium alloy. Thus, only the parts which require the benefits of squeeze casting are formed in this way and so the piston can be produced more easily and cheaply than a wholly squeeze cast piston and with better heat resistance and strength characteristics than a wholly gravity cast or forged piston. This is of particular benefit in large diesel pistons where the volume of piston material is comparatively high.

Figure 2:
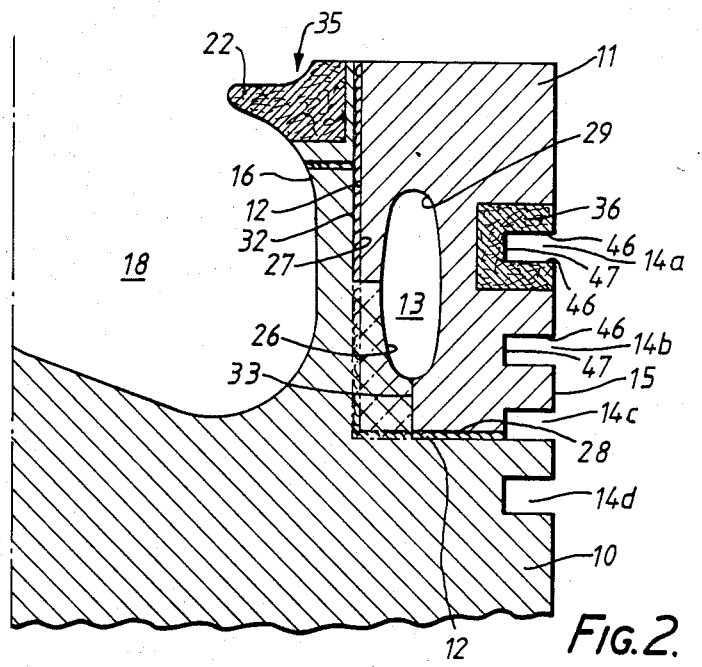
FIG. 2 is a similar view to FIG. 1, showing a second piston for an internal combustion engine, which is formed from main, second and third portions connected together by a welding technique.

Referring next to FIG. 2, parts and features common to FIG. 1 and to FIG. 2 are given the same reference numerals and are not described in detail. In this second piston, the main piston portion 10 is forged or gravity die cast and is formed with the part gallery 26 and the lowermost piston ring groove 14d, as in the FIG. 1 embodiment, and also with the two rebates 27, 28 leading from the upper and lower edges of the gallery part 26. However, in this second piston, the upper end of the upper rebate 27 does not lead to a crown of the piston, but it instead extends radially inwardly to a side wall 16 of the combustion bowl 18.

Second and third squeeze cast piston portions are then formed. The second piston portion 11 is formed by squeeze casting in generally the same way as the second piston portion 11 of the embodiment of FIG. 1. However, in this second portion 11, a reinforcement 36 of fibres or whiskers is provided in the region of the uppermost piston ring groove 14a so that, when formed, this groove 14a has radially extending surfaces 46 and a base 47 reinforced against wear by the associated piston ring groove.

Figure 3:
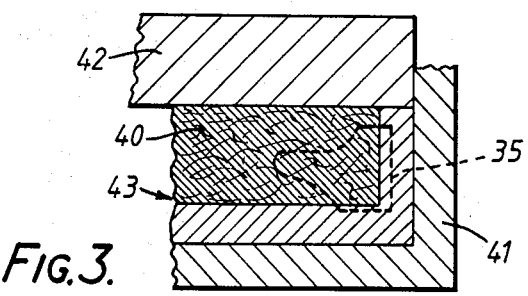
FIG. 3 is a schematic part-section of a squeeze casting die showing the formation of the third portion of the piston of FIG. 2.

The third piston portion 35 is formed in the following way (see FIG. 3). First, a wad or mat 40 of fibres or whiskers are placed in a lower die part 41 of a squeeze casting apparatus. These fibres may be ceramic or metallic fibres or whiskers. The die, when closed by an upper die part 42, is of generally cylindrical configuration. The size of mat or wad 40 is such that it does not fill the closed die completely but leaves a space therearound and thereabove. A molten aluminium or aluminium alloy, such as Lo-Ex, is then gravity fed into the die which is closed by the upper die part 42. The molten metal is solidified under a force of many tonnes which forces the molten metal into the mat or wad of fibres to form an intimate bond therebetween.

After solidification the die is opened and the squeeze cast member 43 so formed is removed. This member is generally cylindrical in shape (see FIG. 3) and has a central portion reinforced by the fibres or whiskers. The squeeze casting process ensures that the member is free from voids and other strength reducing defects and also ensures a strong intimate bond between the fibres or whiskers and the metal. The fibres or whiskers improve the heat resistance of the member and also improve its strength.

The member is next machined to produce the third piston portion 35 in the form of an annular insert whose inner portion defines an entrance 22 to the combustion bowl 18 and which has a lower surface 23 and an axially extending outer surface 24 meeting at a circular edge. The lower surface 23 is inclined upwardly towards the centre of the insert.

To complete the piston, the third piston portion 35 is connected to the main portion 10 by a weld 12 between the lower surface 23 of the portion 35 and the upper radially inwardly extending surface of the rebate 27. The second reinforced portion 11 is connected to this assembly in a manner described above with reference to FIG. 1.

In this way, the completed piston has a reinforced entrance 22 to the combustion bowl 18 which is more heat resistant than the remainder of the piston, and a reinforced upper piston ring groove 14a which is more wear resistant than the remaining grooves. This latter eliminates the need for the use of precast piston ring reinforcement inserts and their incorporation by the so-called Al-Fin process. In addition, in both the first and second pistons, the gallery 13 is formed without use of a salt core casting process. This simplifies considerably the casting steps.

However, as shown in broken line in FIG. 2, the second piston portion 11 may incorporate the whole of the gallery 13, which may be formed in the portion 11 by a salt core process. This has the benefit that the second piston portion 11 is of less complex shape. In addition, it allows unbroken welds 12 between this portion 11 and the main piston portion 10.

Figure 4:
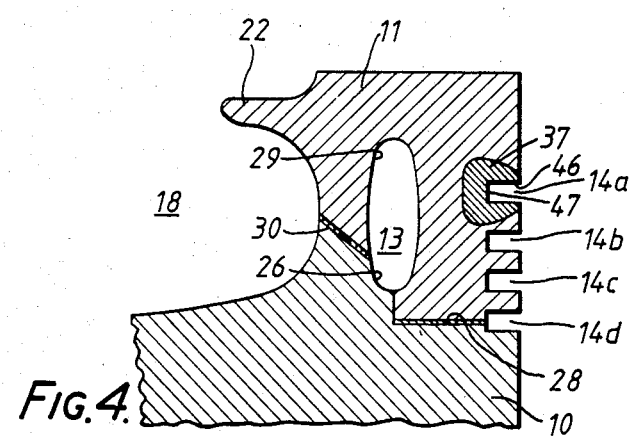
FIG. 4 is a similar view to FIG. 1, showing a third piston for an internal combustion engine, which is formed from main and second portions connected together by a welding technique, the second portion forming an entrance for a combustion bowl of the piston.

Referring next to FIG. 4, parts common to FIG. 4 and to FIGS. 1 to 3 will be given the same reference numerals and will not be described in detail. The third piston is formed by a main piston portion 10 and a second piston portion 11. The main piston portion is gravity die cast or forged, in the same way as the main piston portion 10 of the piston of FIG. 1.

The second piston portion 11 is formed by squeeze casting in generally the same way as the piston portion 11 of the pistons of FIGS. 1 and 2. However, the second piston portion 11 of the piston of FIG. 3 forms the top three piston ring grooves 14a, 14b and 14c and the upper surface and part of the base of the lowermost piston ring groove 14d. Further, this second piston portion 11 includes a ferrous insert 37 incorporated during squeeze casting and connected to the squeeze cast metal by an Al-Fin bond. The insert 37 is so located that in it is formed the uppermost piston ring groove 14a.

Further, this second piston portion 11 defines the whole of the crown of the piston and includes the entrance 22 to the combustion bowl 18.

The second piston portion 11 is shaped to fit in the rebate 28 leading from the lower edge of the gallery portion 26 to the ring band 15 and on a frusto-conical surface 38 leading from the upper edge of the gallery portion 26 to the interior wall of the combustion bowl 18. The second portion 11 is connected to the main piston portion by welds extending between these surfaces, as described above.

In this way, the benefits of the squeeze cast crown and the reinforced piston ring groove are obtained without the need for squeeze casting the whole piston. The squeeze cast second piston portion provides a resistant crown combustion bowl entrance and second and third piston ring grooves 14b, 14c and the ferrous insert 37 provides a reinforced upper piston ring groove 14a with radially extending surfaces 46 and a base 47.

Figure 5:
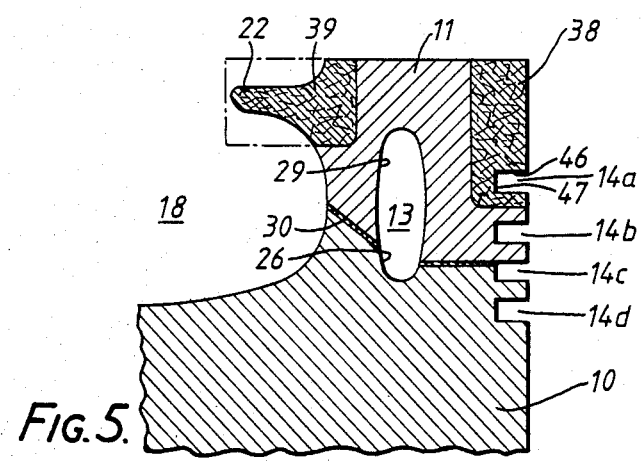
FIG. 5 is a similar view to FIG. 4 showing a first modification of the third piston in which the part of the second piston portion forming the combustion bowl entrance, is reinforced.

Referring next to FIG. 5, the fourth piston is generally similar to the third piston and parts common to FIGS. 4 and 5 will be given the same reference numerals and will not be described in detail. The difference between the piston of FIG. 4 and the piston of FIG. 5 is that, in the piston of FIG. 5, the second piston portion is provided with two reinforcements of fibres or whiskers of any of the kinds described above with reference to FIGS. 1 to 3. These reinforcements are incorporated into the second piston portion during its squeeze casting, as also described above with references to FIGS. 1 to 3.

One reinforcement 38 reinforces the outer edge of the crown and the uppermost piston ring groove 14a while the other fibre reinforcement 39 reinforces the entrance 22 to the combustion bowl 18. As seen in broken line in FIG. 6, the casting from which the second piston portion 11 is made has the part which is to form the entrance 22 to the combustion bowl 18 oversized; this part then being machined to shape as described above with reference to FIG. 3.

In addition, the L-shaped rebate 28 is omitted with the main piston portion 10 and the second piston portion 11 meeting, in this region, at respective annular surfaces extending between the gallery 13 and the ring band 15 and the gallery 13 and the combustion bowl 18. As a result of this, the second piston portion 11 forms only the upper and second piston ring grooves 14a, 14b. The third and fourth piston ring grooves 14c, 14d are formed in the main piston portion 10.

Figure 6:
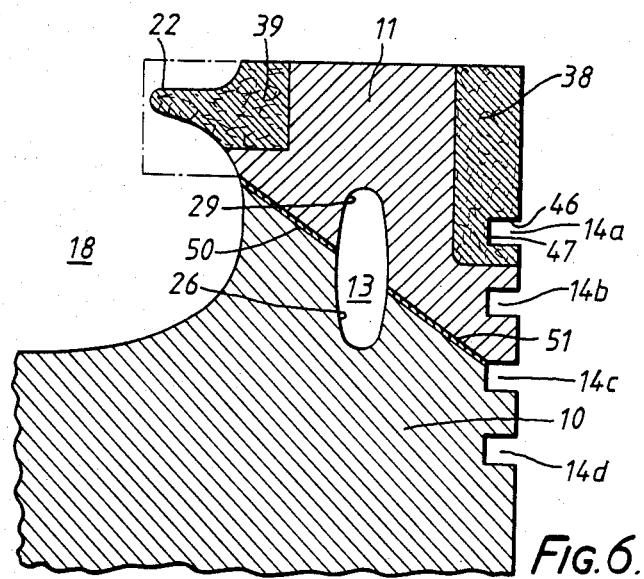
FIG. 6 is a similar view to FIGS. 4 and 5, showing a second modification of the third piston in which the second piston portion is connected to the main piston portion by a weld which intersects in a straight line planes including the piston axis.

Referring next to FIG. 6, this figure shows a modified form of the piston of FIG. 5 and parts common to FIGS. 5 and 6 are given the same reference numerals and will not be described in detail. In this embodiment, the connection between the main piston portion 10 and the second piston portion 11 is on respective mating frusto-conical surfaces 50, 51 inclining downwardly from the combustion bowl 18 to intersect the gallery 13 and terminate at the ring band. As a result of this, the two parts can be connected together by a single weld which thus intersects in a straight line, planes including the piston axis.

This embodiment has the advantage that it is easy to manufacture, because there is only a single weld. There are no unbonded regions between the main piston portion 10 and the second piston portion 11 and the formation of the gallery 13 in two parts 26, 29 is also beneficial in the manufacture of the piston.

Figure 7:
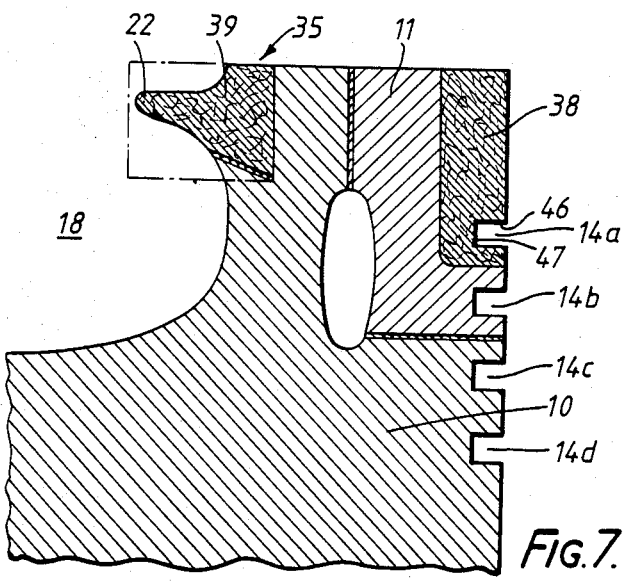
FIG. 7 is a similar view to FIG. 1 and showing a fourth piston for an internal combustion engine, which is formed from main, second and third piston portions, the second and third piston portions being connected separately to the main piston portion.

Referring next to FIG. 7, this embodiment is similar to the embodiment of FIGS. 2 and 3 and parts common to FIGS. 2 and 3 and to FIG. 7 will be given the same reference numerals and will not be described in detail. In this embodiment, the second and third piston portions 11, 35 are formed generally as described above with reference to FIGS. 2 and 3. However, in this embodiment, the fibre or whisker reinforcement 36 in the second piston portion 11 extends to the crown.

The main difference in this FIG. 7 embodiment is that the second and third piston portions 11, 35 are not connected to one another. Rather, the main body portion 11 is formed with two generally L-shaped rebates 44, 45. The first of these rebates 44 extends from the surface of the crown and passes through the gallery 13 before emerging at the ring band 15. The second of these rebates 45 extends from the surface of the crown to the side of the combustion bowl.

The first rebate 44 receives the second piston portion 11 and is welded thereto along the lines of contact. The second L-shaped rebate 45 receives the third piston portion 35 which is welded to these surfaces.

This construction has the benefit that the piston parts can be readily assembled.

Although, in the above-described embodiments, the first body portion 10 is formed by gravity die casting or forging and the second body portion 11 and the third body portion 35 (where provided) are formed by squeeze casting, it will be appreciated that any two different suitable piston-forming processes could be used. For example, where the first body portion 10 is forged, the second and/or third portions 11, 35 may be gravity die cast, with suitable reinforcement. Other combinations are gravity die cast or forged and centrifugal casting.

I claim:

1. A method of manufacturing a piston for an internal combustion engine comprising:
   forming a main body portion by a process selected from forging or gravity die casting, said main body portion having an upper end,
   providing an annular rebate extending around said upper end of the main body portion,
   providing a combustion bowl insert at the upper end of the main body portion,
   providing an annular surface extending around said upper surface between said combustion bowl and said annular rebate,
   forming a second piston portion of annular shape by a squeeze casting process,
   providing by said process an annular wear-resistant reinforcement in a part of the second piston portion in which a piston ring groove is to be formed,
   inserting a mass of a temperature-resistant reinforcing material selected from fibres or whiskers into a generally cylindrical lower die part, the mass being spaced from the lower die part,
   filling the lower die part with molten aluminium alloy,
   closing the lower die part with an upper die part and solidifying the molten metal in a squeeze casting process,
   opening the upper die part and removing therefrom a squeeze cast cylindrical third piston portion formed thereby and having a central portion reinforced by the mass, said central portion being surrounded by unreinforced aluminium alloy, machining said third piston portion to form an annular insert having an inner portion formed from said central reinforced portion and defining a combustion bowl entrance, and outer and lower surfaces formed from said unreinforced aluminium alloy, locating said second piston portion in said annular rebate in said first piston portion and then welding said second piston portion to said first piston portion, said second piston portion projecting upwardly beyond said rebate to form a second rebate with said annular surface on said first piston portion, locating said third piston portion in said second rebate and then welding said outer and lower surfaces of said third piston portion to said first piston portion and said second piston portion to form an entrance to said combustion bowl as to provide a piston crown of squeeze cast material, and forming a piston ring groove in said annular reinforcement of said piston portion.

2. A method according to claim 1, wherein the reinforcement of the second piston portion is provided by fibres or whiskers incorporated during said squeeze casting process.

3. A method according to claim 1, wherein the reinforcement of the second piston portion is provided by an annular insert of a ferrous material incorporated during said squeeze casting process.

4. A method according to claim 1, wherein the second piston portion defines at least a part of a gallery which extends around the interior of the piston.

5. A method according to claim 4, wherein the main piston portion provides an annular first part of the gallery and the second piston portion provides an annular second part of the gallery, the complete gallery being formed when the main and second piston portions are welded together.

6. A method according to claim 1, wherein the welding technique is an electron beam welding technique.

7. A piston when made by the method of claim 1.

* * * * *